US012272784B2

(12) United States Patent
Arthur et al.

(10) Patent No.: US 12,272,784 B2
(45) Date of Patent: Apr. 8, 2025

(54) CERAMIC-SOFT COMPOSITES FOR SOLID-STATE SILICON ANODES

(71) Applicant: Toyota Motor Engineering & Manufacturing North America, Inc., Plano, TX (US)

(72) Inventors: Timothy S. Arthur, Ann Arbor, MI (US); Nikhilendra Singh, Ann Arbor, MI (US); Rana Mohtadi, Northville, MI (US); Oscar Tutusaus, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 435 days.

(21) Appl. No.: 17/004,496

(22) Filed: Aug. 27, 2020

(65) Prior Publication Data

US 2022/0069340 A1 Mar. 3, 2022

(51) Int. Cl.
*H01M 4/04* (2006.01)
*H01M 4/02* (2006.01)
(Continued)

(52) U.S. Cl.
CPC ....... *H01M 10/0562* (2013.01); *H01M 4/043* (2013.01); *H01M 4/386* (2013.01); *H01M 4/625* (2013.01); *H01M 10/0525* (2013.01); *H01M 2004/021* (2013.01); *H01M 2004/027* (2013.01); *H01M 2300/0068* (2013.01); *H01M 2300/0091* (2013.01)

(58) Field of Classification Search
CPC .. H01M 10/0562; H01M 4/043; H01M 4/386; H01M 4/625; H01M 10/0525; H01M 2004/021; H01M 2004/027; H01M 2300/0068; H01M 2300/0091
See application file for complete search history.

(56) References Cited

U.S. PATENT DOCUMENTS

| 7,479,353 B2 | 1/2009 | Hollenkamp et al. |
| 9,318,771 B2 | 4/2016 | Kwon et al. |

(Continued)

OTHER PUBLICATIONS

Anderson H. et al., "Silicon-Carbon composite anodes from industrial battery grade silicon," Scientific Reports (2019) 9:14814, 9 pages.

*Primary Examiner* — Brian R Ohara
*Assistant Examiner* — Emily Elizabeth Freeman
(74) *Attorney, Agent, or Firm* — Christopher G. Darrow; Darrow Mustafa PC

(57) ABSTRACT

An anode composite (AC) for use in an anode for solid-state lithium batteries includes particles of a silicon active material, a carbon additive for electrical conductivity, and a solid electrolyte that combines solid elastic electrolyte (SEE) with a solid non-elastic electrolyte. The solid non-elastic electrolyte is a lithium thiophosphate or other ceramic lithium ion conductor and the SEE includes an ammonium or phosphonium ion closo-borate doped with a lithium salt. The SEE is diffused onto the combined particles uniformly by heating, where pressing achieves about 100% relative density at modest pressures. The anode displays high stability upon charge-discharge cycles of a solid-state lithium battery prepared with the AC layer, appearing to maintain stable intrinsic and extrinsic interfaces.

19 Claims, 8 Drawing Sheets

(51) Int. Cl.
  *H01M 4/38*   (2006.01)
  *H01M 4/62*   (2006.01)
  *H01M 10/0525*  (2010.01)
  *H01M 10/0562*  (2010.01)

(56) References Cited

U.S. PATENT DOCUMENTS

| | | | |
|---|---|---|---|
| 10,326,136 B2 | 6/2019 | Xiao et al. | |
| 2010/0317777 A1* | 12/2010 | Bowen, III | C08K 5/55 |
| | | | 524/109 |
| 2018/0190973 A1* | 7/2018 | Chen | H01M 4/1397 |
| 2019/0252684 A1* | 8/2019 | Yang | H01M 4/0404 |
| 2019/0348705 A1* | 11/2019 | Chen | H01M 10/0565 |
| 2021/0351398 A1* | 11/2021 | Goodman | H01M 4/134 |
| 2021/0408544 A1* | 12/2021 | Sun | H01M 4/366 |
| 2022/0115661 A1* | 4/2022 | Tajima | H01M 4/13 |

* cited by examiner

CERAMIC-SOFT COMPOSITES FOR SOLID-STATE SILICON ANODES

TECHNICAL FIELD

The present disclosure generally relates to electrochemical cells and, more particularly, to anodes for solid-state lithium batteries.

BACKGROUND

Advanced solid-state secondary batteries include a solid electrolyte separator (SE-sep) sandwiched between an anode composite (AC) layer and a cathode composite (Cathode Comp) layer. A typical AC includes carbon, an active material, and a solid electrolyte material. The active material is one that has a high storage capacity for lithium. Interfaces between these AC materials within the AC layer are known as intrinsic interfaces. The interface between the exterior of the AC layer and the SE-sep layer is known as an extrinsic interface. Among the active materials, silicon is one of the most promising, having a high theoretical lithium storage capacity (about ten times that of graphite), a high volumetric capacity, a low lithiation potential, a low discharge voltage, and a modest cost. Unfortunately, silicon tends to fracture upon the insertion and disinsertion cycling of lithium, which is detrimental to both intrinsic and extrinsic interfaces.

Intrinsic interfacial resistance of AC layers increases due to mechanical cracking. The physical contact loss between the solid electrolyte, carbon, and/or anode active material, such as silicon, within the AC layer increases the resistance of the AC layer. Extrinsic interfacial resistance between AC layers increases due to poor interfacial contact between the AC and the SE-sep layers. The mechanical separation upon lithiation and de-lithiation at the interface between the SE-sep and AC layers leads to capacity fade.

Accordingly, the realization of more stable AC layers that overcome the problems associated with degradation of interfaces with silicon containing anodes for solid-state lithium batteries is desirable.

SUMMARY

Disclosed, in various non-limiting embodiments, are anode composite (AC) layers that are silicone/carbon/solid electrolyte composites for forming anodes that are stabile over repetitive charge-discharge cycling of a solid-state Li battery. The solid electrolyte material of the AC includes a soft elastic electrolytes (SEE) with a solid non-elastic electrolyte. The SEE is melt-diffused around the particles and is uniformly distributed throughout silicon particles (active material) and carbon particles (conductive additive) mixture of the AC layer.

In various non-limiting embodiments, the solid electrolyte material includes a solid non-elastic electrolyte that can be a lithium thiophosphate (LPS) combined with an SEE. The LPS can be selected from one or more of $Li_3PS_4$, $Li_7P_3S_{11}$, $Li_{10}GeP_2S_{11}$, $xLi_2S \cdot yP_2S_5 \cdot (100-x-y)LiX(X=Cl, Br and I)$, where x and y are mass % values, both x and y ranging from about 33% to about 50% and where x+y is greater than about 75%, or other solid-state lithium electrolyte. The LPS can be prepared as milled combinations of $Li_2S$ and $P_2S_5$ and/or $GeS_2$. The SEE is an organic cation closo-borane anion salt where the organic cation has flexible and/or asymmetrical substituents attached to a positively charged nitrogen or phosphorus atom and the closo-borane anion can be $CB_{11}H_{12}^-$, $CB_9H_{10}^-$, or $B_{12}H_{12}^{-2}$, or a substituted variation thereof.

In one embodiment, provided herein, the organic cation closo-boron cluster salt is prepared in solution by salt metathesis between a metal cation boron cluster salt, typically an alkaline or earth alkaline cation, and an organic cation salt, typically one with a halide anion. The organic cation closo-boron cluster salt is doped with a Li salt, such as $LiCB_{11}H_{12}$ or $LiCB_9H_{10}$ or both. Doping can involve physically mixing the two salts, heating to a temperature that is sufficient to melt the mixture at least partially, and further mixing as required, to form the doped SEE as a solid upon cooling to 25° C. In one embodiment, provided herein, a method to prepare the AC layer involves a melt diffusion process. The AC is formulated by grinding or milling about 20 to about 80 weight % silicon particles, about 5 to about 30 weight % carbon particles, and about 20 to about 50 weight % solid electrolyte, where the solid electrolyte is LPS, SEE, or a combination thereof, to achieve a well dispersed mixture that is heated to a temperature that is sufficient to melt the SEE but does not exceed a temperature where the LPS crystalizes. By melt infusion of the SEE through the AC particles, the relative density of the anode layer can be approximately 100% and uniform in composition throughout the AC layer when pressed at relatively modest pressure of less than two tons per square centimeter.

In one embodiment, provided herein, the AC is included in an electrochemical device, such as a solid-state lithium battery, as an AC layer in conjunction with a cathode layer and a solid electrolyte separator (SE-sep). The SE-sep can be any solid electrolyte for the transport of $Li^+$ during the charging and discharging of the cell. The cathode can be of any structure for use in a solid-state lithium battery.

These and other features of the solid-state silicon anode and its preparation will become apparent from the following detailed description when read in conjunction with the figures and examples, which are exemplary, not limiting.

BRIEF DESCRIPTION OF THE DRAWINGS

For a better understanding of the processes and devices having a solid-state silicon anode, with regard to the particular variations and examples discussed herein, reference is made to the accompanying figures, in which.

after cycling of their respective half-cells for 100 cycles at 2.0 mA/cm² in a half cell, where boxes are positioned over some large cracks in the "hard" Si-LPS AC that are clearly absent in the "soft" Si-LPS-SEE AC.

Figure 5:
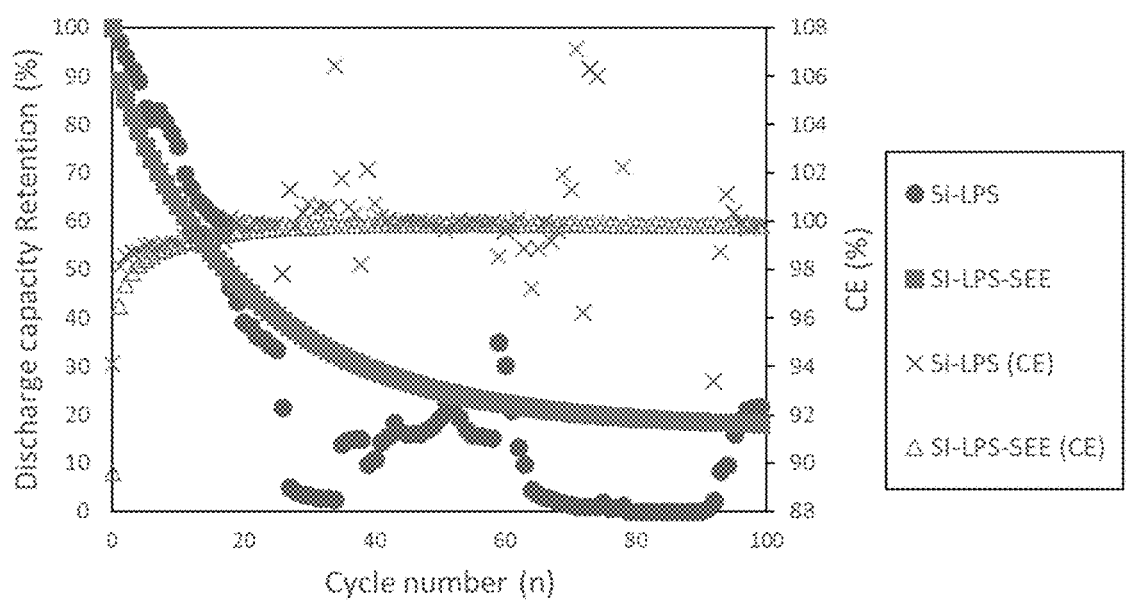

FIG. 5 shows a composite plot for discharge capacity and coulombic efficiency retention for the half-cells with the "hard" Si-LPS AC and the "soft" Si-LPS-SEE Anode Comp, according to an embodiment, where the cycle where fracture occurred with the Si-LPS AC is indicated in a dashed box.

Figure 6:
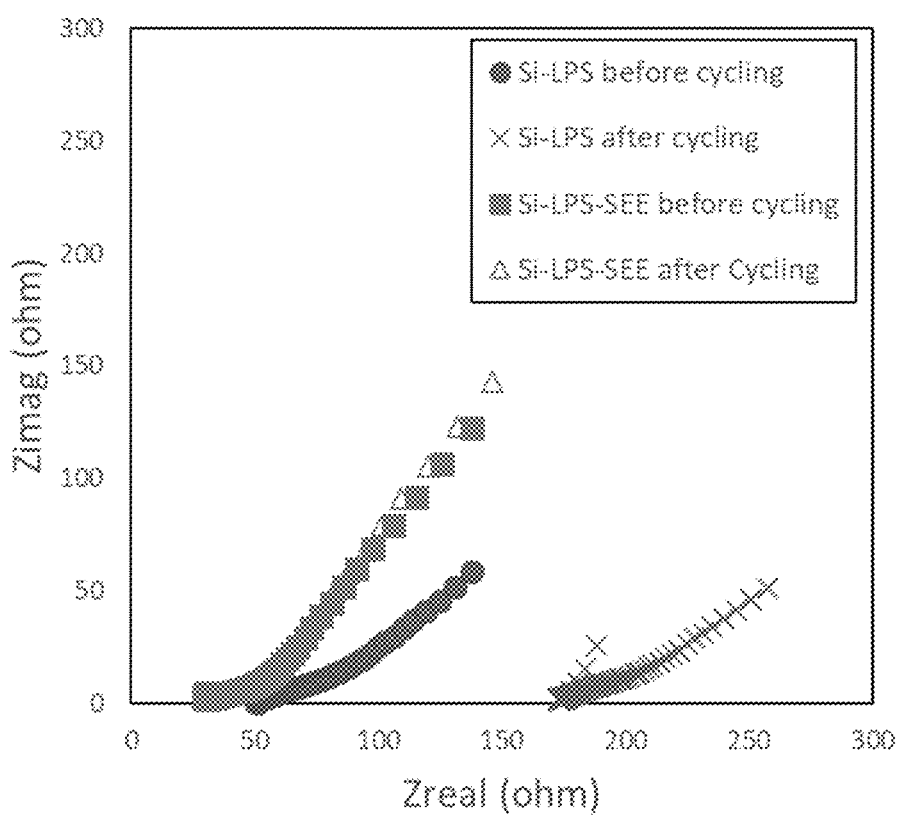

FIG. 6 shows a composite plot for the real and imaginary impedance measured by electrochemical impedance spectroscopy (EIS) before and after 100 cycles for the "hard" Si-LPS AC and the "soft" Si-LPS-SEE AC, according to an embodiment, indicating about a three-fold increase of the resistance upon fracture of the Si-LPS AC.

Figure 7A:
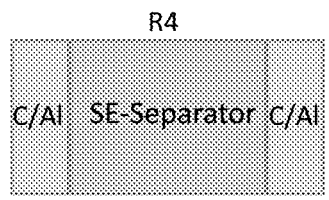
Figure 7B:
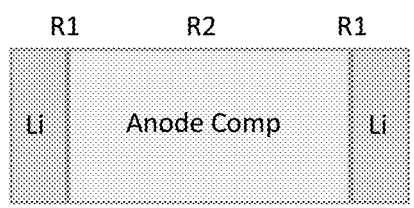
Figure 7C:
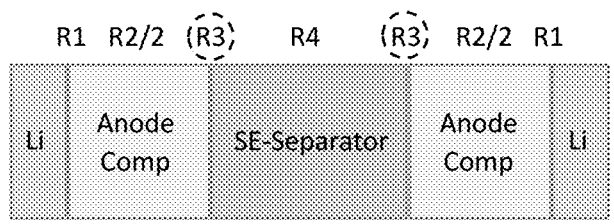

FIGS. 7A-7C show drawings of the symmetric cell designed for determination of the extrinsic resistance, R3, between the AC layer and the SE-sep layer by the difference in resistance for the intrinsic resistances, R4 and R2, of the SE-sep layer of a cell (7A), the AC layer of a cell (7B), and the symmetric cell (7C).

Figure 8:
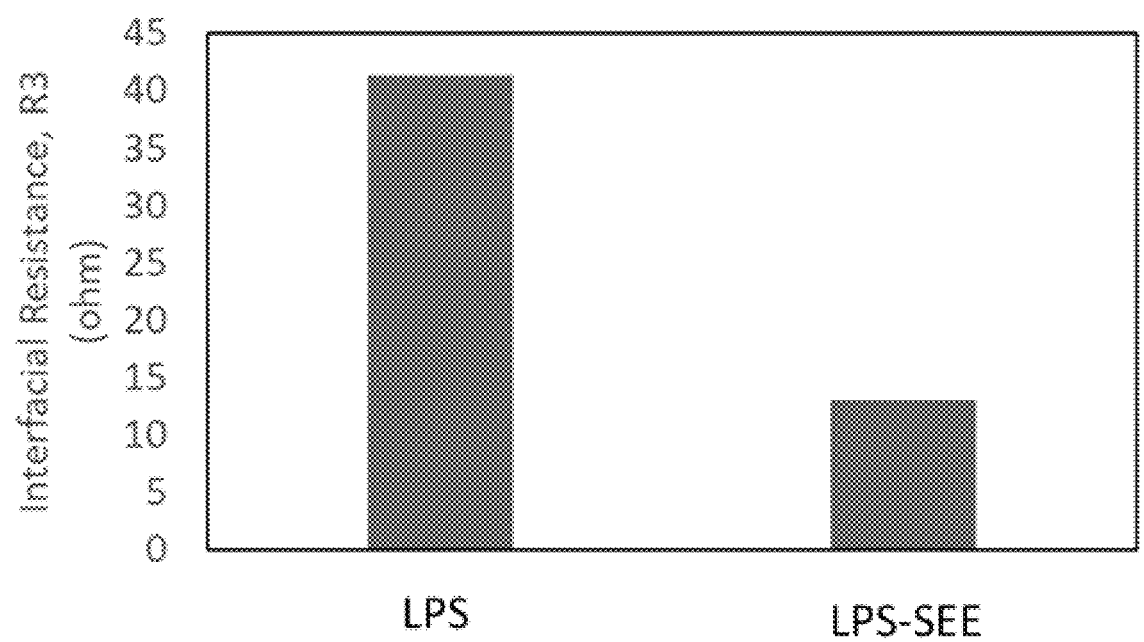

FIG. 8 is a bar graph of the extrinsic resistances displayed between the AC layer and the SE-sep layer for the interfaces between a "hard" Si-LPS AC layer and the SE-sep layer and a "soft" Si-LPS-SEE AC layer, according to an embodiment, and the SE-sep layer.

It should be noted that the figures set forth herein is intended to exemplify the general characteristics of the methods, algorithms, and devices among those of the present technology, for the purpose of the description of certain aspects. The figure may not precisely reflect the characteristics of any given aspect and are not necessarily intended to define or limit specific embodiments within the scope of this technology.

DETAILED DESCRIPTION

The present disclosure provides a composite for use as an anode for a lithium battery. The anode composite (AC) is a layer that includes a silicon powder with a carbon additive and a solid electrolyte that combines a soft elastic electrolyte (SEE) and a solid non-elastic electrolyte. The Si—C powder combined with the electrolytes is melt diffused with the SSE to give a uniform composition that provides a stable anode. The stable anode does not display evidence of fracture between internal interfaces and external interfaces, as are observed with other anode composites that lack the SEE. Proportions of the Si to C and the electrolytes can vary from 20 to about 80 weight % silicon, from about 5 to about 30 weight % carbon, and from about 20 to about 50 weight % solid electrolyte.

The present disclosure provides for an anode electrolyte that can be a combination of a solid non-elastic electrolyte, such as a lithium thiophosphate (LPS), with an SEE that can be an organic cation closo-borate anion salt that can be doped with a lithium closo-borate. The LPS and the SEE are combined such that the SEE is from about one to about 50 mole % of the anode electrolyte. The LPS can be $Li_3PS_4$, $Li_7P_3S_{11}$, $Li_{10}GeP_2S_{11}$, or $xLi_2S \cdot yP_2S_5 \cdot (100-x-y)LiX$ (X=Cl, Br and I), where x and y are mass % values, both x and y ranging from about 33% to about 50%, and where x+y is greater than about 75%. The LPS can be prepared by ball-milling or otherwise milling designed combinations of $Li_2S$, $P_2S_5$ and $GeS_2$. Alternatively, solution or microwave assisted methods can be employed to form the LPS. The solid non-elastic electrolyte can be other than an LPS, for example NASICON-type Li ion electrolytes, such as $Li_{1.3}Al_{0.3}Ti_{1.7}(PO_4)_3$ (LATP), $Li_{1+x+y}Al_xTi_{2-x}Si_yP_{3-y}O_{12}$, $LiNi_{0.6}Co_{0.2}Mn_{0.2}O_2$, $Li_{0.33}La_{0.55}TiO_3$ (LLTO), $Li_{9.54}Si_{1.74}P_{1.44}S_{11.7}Cl_{0.3}$, and composites of these and other fillers, such as $Li_6ZnNb_4O_{14}$ (LZNO) with LPS. The SEE can be an organic cation closo-borane anion salt where the organic cation has flexible and/or asymmetrical substituents attached to a positively charged nitrogen or phosphorus atom and the closo-borane anion can be $CB_{11}H_{12}^-$, $CB_9H_{10}^-$, $B_{12}H_{12}^{-2}$, substituted variations thereof, and combinations thereof.

The present disclosure provides for formation of the organic cation closo-boron cluster salt by salt metathesis between a metal cation boron cluster salt, typically an alkaline or earth alkaline cation, and an organic cation salt, typically a halide anion in solution. The organic cation closo-boron cluster salt is doped with a Li salt, such as $LiCB_{11}H_{12}$ or $LiCB_9H_{10}$ or both. Doping can involve physically mixing the two salts, heating to a temperature that is sufficient to melt the mixture at least partially, and further mixing as required, to form the doped SEE as a solid upon cooling to 25° C. The SEE has an organic cation that is an ammonium or phosphonium ion of the structure $[(CR^1R^2)_n]_wZ(R^3)_{4-2w}^+$ where: n is 4 to 6; w is 0 to 2; Z is N or P; $R^3$ groups are independently $C_1$-$C_8$ alkyl or $C_6$-$C_{10}$ aryl unsubstituted or substituted one or more times with fluorine, alkyl, monofluorinated to perfluorinated alkyl, alkoxy, monofluorinated to perfluorinated alkoxy, phenyl, monofluorinated to perfluorinated phenyl, phenoxy or monofluorinated to perfluorinated phenoxy, and where any alkyl or alkoxy group is linear, branched or cyclic; $R^1$ and $R^2$ groups are independently hydrogen, $C_1$-$C_8$ alkyl, $C_1$-$C_8$ alkoxy, $C_6$-$C_{10}$ aryl, or $C_6$-$C_{10}$ aryloxy, where the carbons are unsubstituted or substituted one or more times with fluorine, alkyl, monofluorinated to perfluorinated alkyl, alkoxy, monofluorinated to perfluorinated alkoxy, phenyl, monofluorinated to perfluorinated phenyl, phenoxy or monofluorinated to perfluorinated phenoxy, and where any alkyl or alkoxy group is linear, branched or cyclic. When w is 0 or 1, the $R^3$ groups can include at least two different structures or when all $R^3$ groups are the same, $R^3$ group contains a chiral center but the combined les is racemic. When w is 2 the two $[(CR^1R^2)_n]Z^+$ cyclic structures of the spiro-ammonium or phosphonium ion can be different or when the two $[(CR^1R^2)_n]Z^+$ cyclics are the same at least one of the $CR^1R^2$ has different $R^1$ and $R^2$ groups and the $R^1$ and $R^2$ groups are randomly situated on both faces of the structure, for example randomly situated in axial and equatorial position of n=5 cyclic. The Z atom can be, but is not necessarily, a chiral center, or any of $R^1$, $R^2$ or $R^3$ groups can be, but is not necessarily, chiral. A plurality of different organic cations can be combined with one or more closo-borate anions to constitute the organic cation closo-borate anion salt. An additional Li closo-borate can have the same or different closo-borate as that of the ammonium or phosphonium closo-borate of the SEE.

The present disclosure provides for inclusion of closo-borates anions with the organic cations or the $Li^+$ that can be one or more of $B_{12}H_{12}^{-2}$, $CB_{11}H_{12}^{-1}$, $CB_9H_{10}^{-1}$, or a substituted derivative thereof. The substituted derivative closo-borate anions can have the structure $C_yB_{a-y}H_{a-z}X_z^{-(2-y)}$, where: y is 0 or 1; a is 12 when y is 0 and a is 10 or 12 when y is 1; z is 0 to a; and X is independently halogen, alkyl, alkoxy, aryl, alkylaryl, arylalkyl, and/or aryloxy substituents and wherein alkyl groups can be linear, branched, or cyclic, and wherein any substituent can be partially or fully halogenated.

In various embodiments provided herein, a method is presented for formation of the AC from a silicon powder that is doped with carbon, which can be formed by the grinding or milling of silicon metal with graphite, carbon black, fullerenes, nanotubes, nanopowders, nanofibers, or any form of carbon that can enhance the electrical conductivity of the powder. The milling can be of any form including ball milling and jet milling. The milling is carried out until the Si—C particles are less than about 10 μm in size, for example, less than about 1 μm, 300 nm in size, or less than about 50 nm in size. The crystallite size of the particles can be less than about 1 μm, 300 nm, less than 100 nm, or less than about 50 nm.

The LPS and soft organic ammonium or phosphonium cation closo-borate anion salt anode electrolyte, where the LPS is from about 50 to about 99 mole % and the SEE is doped with a lithium closo-borate, can be ground or milled to a size of less than about 10 μm in size, for example, less than about 300 nm in size, or less than about 50 nm in size. The anode electrolyte can then be mixed with the Si—C and the AC formed by grinding or milling the combined powders, followed by heating to melt the SEE electrolyte and form a dense AC layer. The inclusion of the "soft" SEE electrolyte allows generation of a dense AC layer for a Li battery by pressing at pressures that are significantly lower than those required to form a dense AC layer absent the "soft" SEE electrolyte. For example, a molding pressure of less than two tons/cm$^2$ can form a denser AC layer with the SEE, which has a relative density to that of the theoretical fully dense material of about 100%, than can be achieved for formation of a "hard" AC layer, absent the SEE, at more than about five tons/cm$^2$.

Various aspects of the present disclosure are further illustrated with respect to the following Examples. It is to be understood that these Examples are provided to illustrate specific embodiments of the present disclosure and should not be construed as limiting the scope of the present disclosure in or to any particular aspect.

Example 1

Li$_2$S and P$_2$S$_5$, 3:1 mol:mol, are ball-milled for 50 hours under argon at 25° C. to form Li$_3$PS$_4$ (LPS).

Example 2

Synthesis of SEE: A metathesis preparation of and SEE was carried out by grinding LiCB (3.85 g) and LiCB$_9$H$_{10}$ (3.24 g) with 1-butyl-1-methylpyrrolidinium chloride (Pyr$_{14}$Cl) (3.31 g) with a mortar and pestle under argon for 30 minutes to obtain a homogeneous powder. The homogeneous powder was transferred to a stirred vessel where stirring was maintained for 24 hours at 160° C.

Example 3

Comparative Anode Composite (AC) Si-LPS: The combination of Si:LPS:Carbon at a 55:35:10 mass:mass:mass ratio was ground in a mortar and pestle at 25° C. for 15 minutes under argon.

Example 4

Anode Composite (AC) Si-LPS-SEE: The LPS and the SEE were combined and ground in a mortar with a pestle for 15 minutes at 25° C. under Argon. Silicon and carbon were added to the mortar and grinding was continued for 15 minutes at 25° C. under Argon. The combined ground AC powder was heated to 120° C. for 30 minutes to uniformly diffuse the SEE through the mass followed by cooling to ambient temperatures to prepare an AC.

Figure 1A:
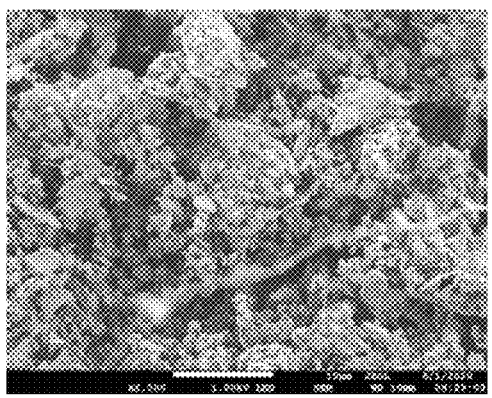
FIGS. 1A-1D show scanning electron microscope (SEM) images of Si-LPS-SEE Anode Composite (AC) powder (1A) and a pressed pellet therefrom (1B) comprising a closo-borane anion in the SEE, and Boron Energy Dispersive X-ray Spectroscopy (EDS) maps displaying a uniform distribution of the SEE in the powder (1C) and the pellet (1D) after the melt-diffusion of the SEE uniformly through the Si-LPS powders.
Figure 1B:
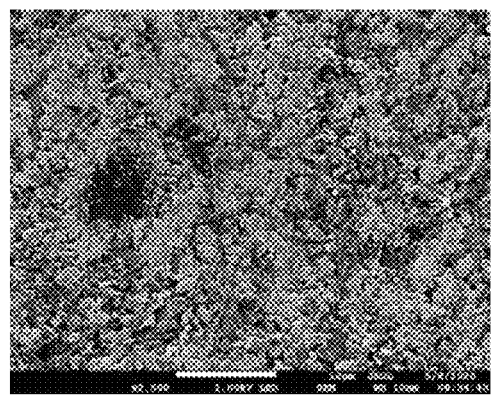
Figure 1C:
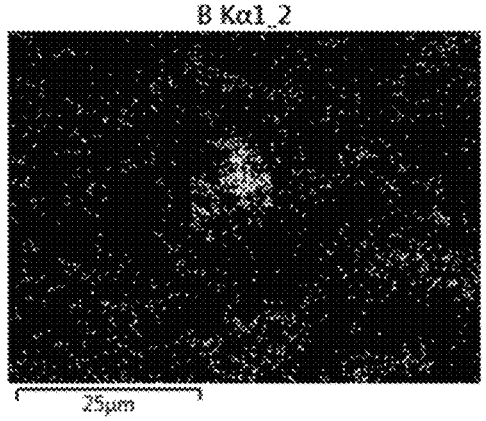
Figure 1D:
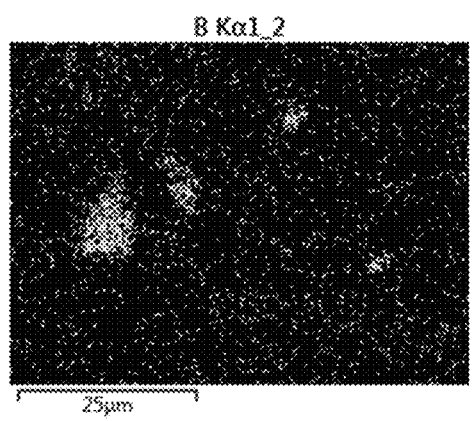

The AC powder displays the morphology shown in FIG. 1A, which is essentially retained with densification upon pressing to a 1.128 cm diameter pellet by applying a 10-ton pressure, as shown in FIG. 1B. The powder and the pellet were analyzed by EDS spectroscopy, as shown in FIGS. 1C and 1D respectively, which indicates a uniform distribution of boron throughout the AC and AC layer.

Example 5

Figure 2:
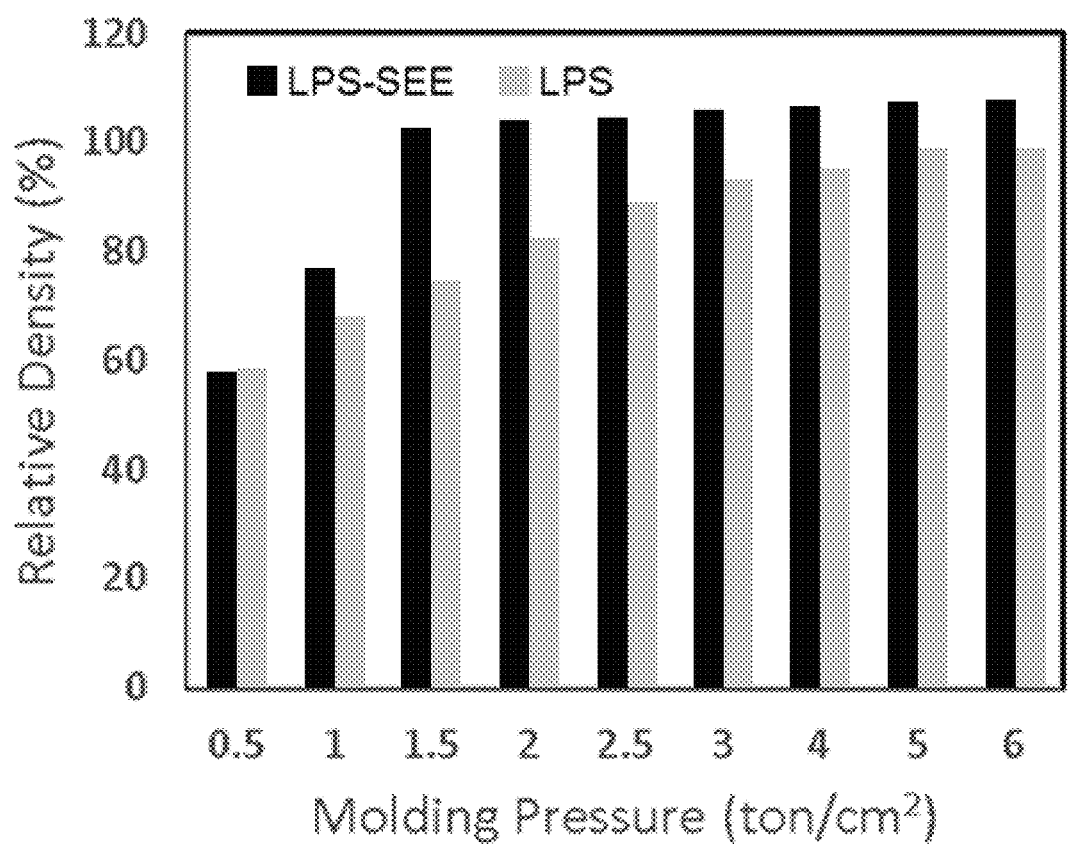
FIG. 2 is a bar chart of the relative densities of an LPS pellet and an LPS-SEE pellet pressed at progressively higher pressures where a maximum relative density of about 100% is achieved at about 1.5 ton/cm² pressure for the LPS-SEE yet requires five ton/cm² pressure to achieve its maximum LPS relative density, which is lower than 100%.

Relative Density of LPS-SEE composites: A combined LPS-SEE composite pellet was pressed at various pressures to determine the change of the density of the pellet of the anode materials and define a lowest viable molding pressure to give a high density pellet that is sufficiently soft to accommodate the volume expansion and contraction upon charging-discharging cycling. The pellets dimensions were measured to calculate the relative density of LPS and LPS-SEE composites achieved at rising molding pressures. FIG. 2 shows the relative density differences between LPS and LPS-SEE composites and the relative density change with applied pressure. The LPS-SEE composites can reach a higher, nearly constant maximum relative density at a lower applied pressures than the pellet without the SEE content. This shows that LPS-SEE is a softer composite. Softer composites alleviate mechanical stresses imposed during silicon expansion and contraction upon lithiation and de-lithiation.

Example 6

Figure 3C:
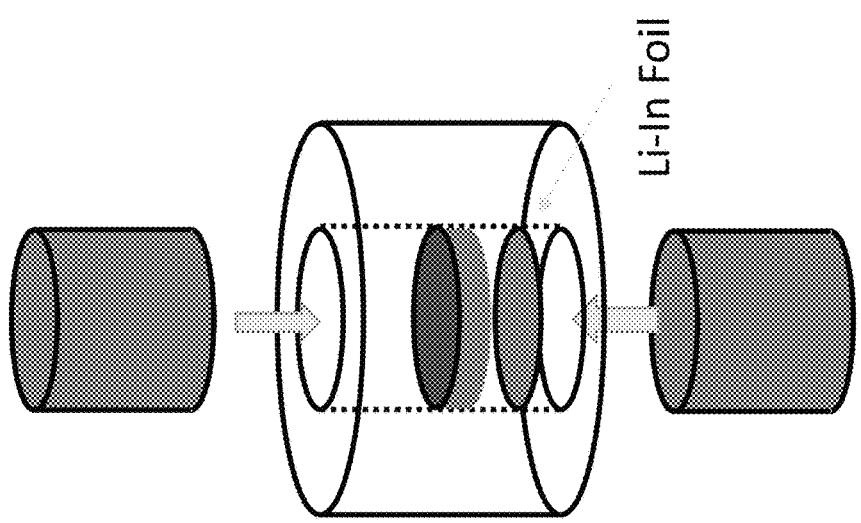
FIGS. 3A-3C are drawings of the steps for construction of half-cells by: (3A) pressing a lithium halide-doped lithium thiophosphate electrolyte; (3B) pressing the electrolyte with a Si-LPS-SEE Anode Comp, according to an embodiment, or Si-LPS Anode Comp; and (3C) pressing the electrolyte-anode with a lithium-indium foil cathode.
Figure 3B:
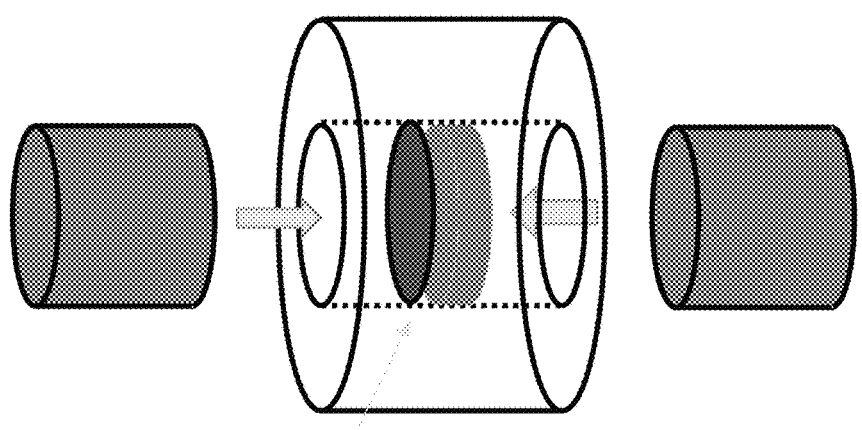
Figure 3A:
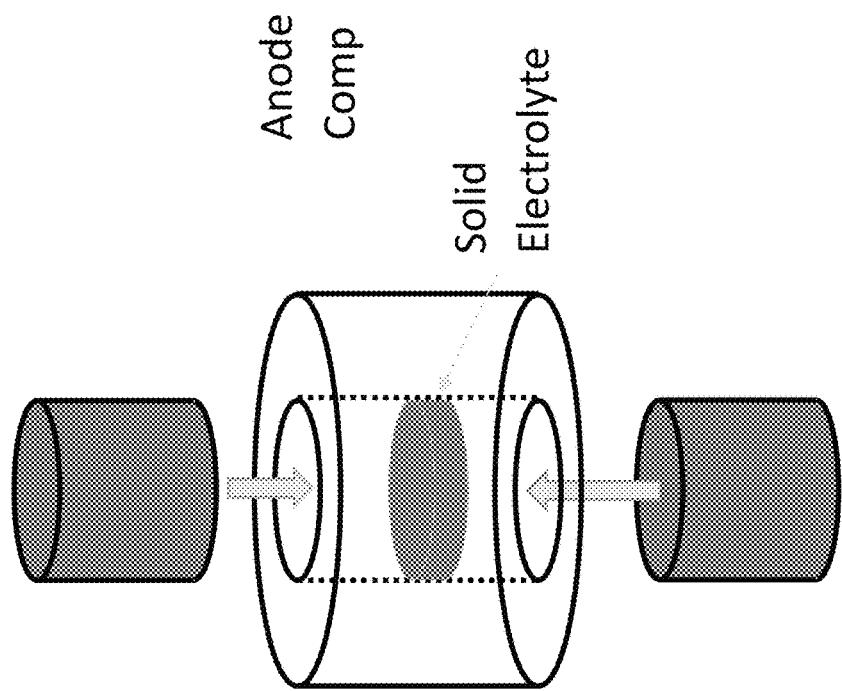

Anode Composite half-cells: As indicated in the drawing of FIGS. 3A-3C, solid-state cells were fabricated by: (3A) pressing solid electrolyte powder into a pellet, (3B) spreading cathode material over the solid electrolyte surface and pressing the stack, and (3C) spreading the anode material over the opposite side of the solid electrolyte and pressing the stack a third time. In this manner, Anode Comp/solid electrolyte/lithium-indium cells were fabricated, where: (3A) 80 to 300 mg of lithium halide-doped lithium thiophosphate was cold-pressed into a 1.128 cm diameter pellet using 0.5 to 10 tons of pressure; (3B) 1 to 300 mg of Si-LPS or Si-LPS-SEE powder was spread on the solid electrolyte pellet and the stack pressed using 0.1 to 6 tons of pressure; and (3C) lithium-indium foil was placed against the opposing side of the solid electrolyte and the stack pressed at 0 to 4 tons of pressure.

Example 7

Figure 4B:
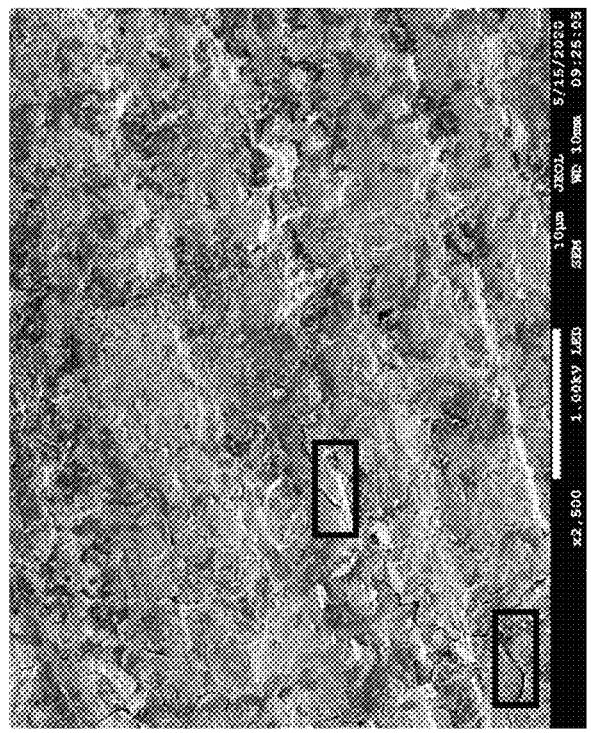
FIGS. 4A-4B show SEM images of an Si-LPS-SEE AC (4A), according to an embodiment, and an Si-LPS AC (4B)
Figure 4A:
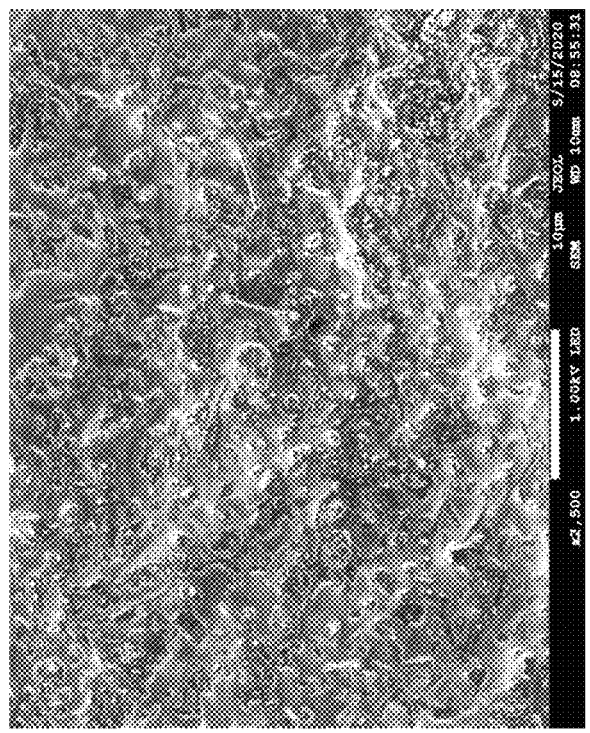

Stability of the Anode Comp: The "softness" provided by the Si-LP S-SEE AC allowed a robustness that was not attainable for the Si-LPS AC that is absent the OIPC content. SEM analysis of the Si-LPS AC pellets of FIG. 4A shows cracking upon cycling that clearly contrasts with the Si-LPS-SEE AC pellets of FIG. 4B where no cracks are observable after cycling. Cycling stability was confirmed by the capacitance retention and coulombic efficiency change upon cycling, as shown in FIG. 5 and conduct electrochemical impedance spectroscopy FIG. 6 of the Anode Comps, where the superior stability of the "soft" Si-LPS-SEE AC is indicted and where the early cracking of the "hard" Si-LPS AC is clearly evident after approximately 25 cycles and its ultimate resistance is increased about three-fold upon fracture.

Example 8

Li—Li symmetrical cells: Symmetric cells with a pair of lithium electrodes were constructed with the structures shown in FIGS. 7A-7C to examine the resistance of the extrinsic interface between AC layers and contacting Separator-SE layers. To isolate the resistance due to the extrinsic interface Cells A, B, and C were constructed as shown in FIGS. 7A-7C such that by subtracting the summed internal resistances resulting from the SE-sep layer and the AC layer from the two external resistances from the two interfaces between the SE-sep layer and the AC layer. The extrinsic interfacial resistance R3 is equal to the resistance measured for the cell of C minus that of cells A and B divided by two:

$$R3 = (\text{Cell } 7C - \text{Cell } 7B - \text{Cell } 7A)/2.$$

As shown in FIG. 8, the resulting extrinsic resistance between the SE-sep layer and the "soft" Si-LPS-SEE AC layer is considerably less, approximately one third, than that between the SE-sep layer and the "hard" Si-LPS AC layer.

The preceding description is merely illustrative in nature and is in no way intended to limit the disclosure, its application, or uses. As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range.

The headings (such as "Background" and "Summary") and sub-headings used herein are intended only for general organization of topics within the present disclosure, and are not intended to limit the disclosure of the technology or any aspect thereof. The recitation of multiple embodiments having stated features is not intended to exclude other embodiments having additional features, or other embodiments incorporating different combinations of the stated features.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an embodiment can or may comprise certain elements or features does not exclude other embodiments of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an embodiment or particular system is included in at least one embodiment or aspect. The appearances of the phrase "in one aspect" (or variations thereof) are not necessarily referring to the same aspect or embodiment. It should be also understood that the various method steps discussed herein do not have to be carried out in the same order as depicted, and not each method step is required in each aspect or embodiment.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations should not be regarded as a departure from the disclosure, and all such modifications are intended to be included within the scope of the disclosure.

While particular embodiments have been described, alternatives, modifications, variations, improvements, and substantial equivalents that are or may be presently unforeseen may arise to applicants or others skilled in the art. Accordingly, the appended claims as filed and as they may be amended, are intended to embrace all such alternatives, modifications variations, improvements, and substantial equivalents.

What is claimed is:

1. An anode composite (AC) for storage and release of lithium, comprising:
    from about 20 weight % to about 80 weight % of a plurality of silicon particles;
    from about 5 weight % to about 30 weight % of a plurality of carbon particles; and
    from about 20 weight % to about 50 weight % of a plurality of solid electrolyte particles, the plurality of solid electrolyte particles comprising a soft elastic electrolyte (SEE) and a solid non-elastic electrolyte, wherein the solid non-elastic electrolyte comprises lithium ions, and wherein the plurality of silicon particles, the plurality of carbon particles, and the plurality of solid electrolyte particles are uniformly dispersed; and wherein the SEE is melt diffused throughout the AC.

2. The AC for storage and release of lithium according to claim 1, wherein the silicon particles are from about 50 nm to about 10,000 nm in a cross-section dimension, the carbon particles are from about 50 nm to about 10,000 nm in a cross-section dimension, and the solid electrolyte particles are from about 50 nm to about 10,000 nm in a cross-section dimension.

3. The AC for storage and release of lithium according to claim 1, wherein the AC has about 100% relative density when pressed at a pressure of more than about 1.5 ton/cm$^2$.

4. The AC for storage and release of lithium according to claim 1, wherein the solid non-elastic electrolyte comprises at least one of:
    $Li_3PS_4$;
    $Li_7P_3S_{11}$;
    $Li_{10}GeP_2S_{11}$;
    $xLi_2S \cdot yP_2S_5 \cdot (100-x-y)$ LiX, where X is Cl, Br, or I, x and y are mass % of from about 30% to about 50% and where x+y is greater than about 75%;
    ground or milled combinations of $Li_2S$ with $P_2S_5$ and/or $GeS_2$;
    $Li_{1.3}Al_{0.3}Ti_{1.7}(PO_4)_3$ (LATP);
    $Li_{0.33}La_{0.55}TiO_3$ (LLTO);
    $Li_{9.54}Si_{1.74}P_{1.44}S_{11.7}Cl_{0.3}$;
    any combinations thereof; and
    any of the solid non-elastic electrolytes in a composite with $Li_6ZnNb_4O_{14}$ (LZNO).

5. The AC for storage and release of lithium according to claim 1, wherein the SEE comprises:
  at least one ammonium or phosphonium ion of the structure: $[(CR^1R^2)_n]_w Z(R^3)_{4-2w}^+$,
  where:
    n is 4 to 6;
    w is 0 to 2;
    Z is N or P;
    $R^3$ groups are independently $C_1$-$C_8$ alkyl or $C_6$-$C_{10}$ aryl and is unsubstituted or substituted one or more times with fluorine, alkyl, monofluorinated to perfluorinated alkyl, alkoxy, monofluorinated to perfluorinated alkoxy, phenyl, monofluorinated to perfluorinated phenyl, phenoxy or monofluorinated to perfluorinated phenoxy, and where any alkyl or alkoxy group is linear, branched or cyclic; and
    $R^1$ and $R^2$ groups are independently hydrogen, $C_1$-$C_8$ alkyl, $C_1$-$C_8$ alkoxy, $C_6$-$C_{10}$ aryl, or $C_6$-$C_{10}$ aryloxy and are unsubstituted or substituted one or more times with fluorine, alkyl, monofluorinated to perfluorinated alkyl, alkoxy, monofluorinated to perfluorinated alkoxy, phenyl, monofluorinated to perfluorinated phenyl, phenoxy or monofluorinated to perfluorinated phenoxy, and where any alkyl or alkoxy group is linear, branched or cyclic; and
  at least one closo-borane anion selected from the group consisting of $CB_{11}H_{12}^-$, $CB_9H_{10}^-$, $B_{12}H_{12}^{-2}$, and $C_y B_{a-y} H_{a-z} X_z^{-(2-y)}$,
  where:
    y is 0 or 1;
    a is 12 when y is 0 and a is 10 or 12 when y is 1;
    z is 0 to a; and
    X is independently halogen, alkyl, alkoxy, aryl, alkylaryl, arylalkyl, and/or aryloxy substituents and wherein alkyl groups can be linear, branched, or cyclic, and wherein any substituent can be partially or fully halogenated, or any combination thereof.

6. The AC for storage and release of lithium according to claim 5, wherein the ammonium or phosphonium ion has the structure:
  $Z(R^3)_4^+$ and at least one $R^3$ is a different structure than other of the $R^3$, or $R^3$ contains a chiral center and a plurality of $R^3$ groups is racemic;
  $[(CR^1R^2)_n]Z(R^3)_2^+$ and at least one $R^3$ is a different structure than other of the $R^3$, or $R^3$ contains a chiral center and a plurality of $R^3$ groups is racemic and/or the $[(CR^1R^2)_n]Z^+$ cyclic has at least one of the $CR^1R^2$ having $R^1$ different from $R^2$; or
  a spiro-ammonium or phosphonium ion with the structure $[(CR^1R^2)_n]_2 Z^+$ wherein the two of $[(CR^1R^2)_n]Z^+$ cyclics are different or the $[(CR^1R^2)_n]Z^+$ cyclics are the same with at least one of the $CR^1R^2$ has different $R^1$ and $R^2$ groups and where the $R^1$ and $R^2$ groups are randomly situated on both faces of the structure.

7. The AC for storage and release of lithium according to claim 5, wherein the SEE further comprises at least one lithium salt having a closo-borane anion selected from one or more of $CB_{11}H_{12}^-$, $CB_9H_{10}^-$, $B_{12}H_{12}^{-2}$, and $C_y B_{a-y} H_{a-z} X_z^{-(2-y)}$, where:
  y is 0 or 1;
  a is 12 when y is 0, and a is 10 or 12 when y is 1;
  z is 0 to a; and
  X is independently halogen, alkyl, alkoxy, aryl, alkylaryl, arylalkyl, and/or aryloxy substituents and wherein alkyl groups can be linear, branched, or cyclic, and wherein any substituent can be partially or fully halogenated, or any combination thereof.

8. A lithium battery comprising:
  an anode composite (AC) comprising:
    from about 20 weight % to about 80 weight % silicon particles;
    from about 5 weight % to about 30 weight % carbon particles; and
    from about 20 weight % to about 50 weight % solid electrolyte particles, wherein the solid electrolyte particles comprise:
    a soft elastic electrolyte (SEE) comprising at least one ammonium or phosphonium ion and at least one closo-borane anion selected from the group consisting $B_{12}H_{12}^{-2}$, and $C_y B_{a-y} H_{a-z} X_z^{-(2-y)}$, where y is 0 or 1, a is 12 when y is 0 and a is 10 or 12 when y is 1, z is 0 to a, and X is independently halogen, alkyl, alkoxy, aryl, alkylaryl, arylalkyl, and/or aryloxy substituents and wherein alkyl groups can be linear, branched, or cyclic, and wherein any substituent can be partially or fully halogenated, or any combination thereof; and
    a solid non-elastic electrolyte, wherein the solid non-elastic electrolyte comprises lithium ion, wherein the silicon particles, the carbon particles, and the solid electrolyte particles are uniformly dispersed in the AC, and wherein the SEE is melt diffused throughout the AC.

9. The lithium battery according to claim 8, wherein the solid non-elastic electrolyte comprises at least one of:
  $Li_3PS_4$;
  $Li_7P_3S_{11}$;
  $Li_{10}GeP_2S_{11}$;
  $xLi_2S \cdot yP_2S_5 \cdot (100-x-y)LiX$, where X is Cl, Br, or I, x and y are mass % of from about 30% to about 50% and where x+y is greater than about 75%;
  ground or milled combinations of $Li_2S$ with $P_2S_5$ and/or $GeS_2$;
  $Li_{1.3}Al_{0.3}Ti_{1.7}(PO_4)_3$ (LATP);
  $Li_{0.33}La_{0.55}TiO_3$ (LLTO);
  $Li_{9.54}Si_{1.74}P_{1.44}S_{11.7}Cl_{0.3}$;
  any combinations thereof; and
  any of the solid non-elastic electrolytes as a composite with $Li_6ZnNb_4O_{14}$ (LZNO).

10. The lithium battery according to claim 8, wherein the at least one ammonium or phosphonium ion comprises the structure:
  $[(CR^1R^2)_n]_w Z(R^3)_{4-2w}^+$
  where:
    n is 4 to 6;
    w is 0 to 2;
    Z is N or P;
    $R^3$ groups are independently $C_1$-$C_8$ alkyl or $C_6$-$C_{10}$ aryl and is unsubstituted or substituted one or more times with fluorine, alkyl, monofluorinated to perfluorinated alkyl, alkoxy, monofluorinated to perfluorinated alkoxy, phenyl, monofluorinated to perfluorinated phenyl, phenoxy or monofluorinated to perfluorinated phenoxy, and where any alkyl or alkoxy group is linear, branched or cyclic; and
    $R^1$ and $R^2$ groups are independently hydrogen, $C_1$-$C_8$ alkyl, $C_1$-$C_8$ alkoxy, $C_6$-$C_{10}$ aryl, or $C_6$-$C_{10}$ aryloxy and are unsubstituted or substituted one or more times with fluorine, alkyl, monofluorinated to perfluorinated alkyl, alkoxy, monofluorinated to perfluorinated alkoxy, phenyl, monofluorinated to perfluorinated phenyl, phenoxy or monofluorinated to perfluorinated phenoxy, and where any alkyl or alkoxy group is linear, branched or cyclic.

11. The lithium battery according to claim 10, wherein the SEE further comprises at least one lithium salt having a closo-borane anion selected from one or more of $CB_{11}H_{12}^{-}$, $CB_9H_{10}^{-}$, $B_{12}H_{12}^{-2}$, and $C_yB_{a-y}H_{a-z}X_z^{-(2-y)}$, where:
   y is 0 or 1;
   a is 12 when y is 0 and a is 10 or 12 when y is 1;
   z is 0 to a; and
   X is independently halogen, alkyl, alkoxy, aryl, alkylaryl, arylalkyl, and/or aryloxy substituents and wherein alkyl groups can be linear, branched, or cyclic, and wherein any substituent can be partially or fully halogenated, or any combination thereof.

12. An anode composite (AC) for storage and release of lithium, comprising:
   from about 20 weight % to about 80 weight % of a plurality of silicon particles with a cross-section dimension from about 50 nm to about 10,000 nm;
   from about 5 weight % to about 30 weight % of a plurality of carbon particles; and
   from about 20 weight % to about 50 weight % of a plurality of solid electrolyte particles, the plurality of solid electrolyte particles comprising a soft elastic electrolyte (SEE) and a solid non-elastic electrolyte, wherein the solid non-elastic electrolyte comprises lithium ions, and wherein the plurality of silicon particles, the plurality of carbon particles, and the plurality of solid electrolyte particles are uniformly dispersed; and wherein the SEE is melt diffused throughout the AC.

13. The AC storage for storage and release of lithium according to claim 12, wherein the carbon particles are from about 50 nm to about 10,000 nm in a cross-section dimension.

14. The AC storage for storage and release of lithium according to claim 13, wherein the solid electrolyte particles are from about 50 nm to about 10,000 nm in a cross-section dimension.

15. The AC storage for storage and release of lithium according to claim 12, wherein the AC has about 100% relative density when pressed at a pressure of more than about 1.5 ton/cm$^2$.

16. The AC for storage and release of lithium according to claim 12, wherein the solid non-elastic electrolyte comprises at least one of:
   $Li_3PS_4$;
   $Li_7P_3S_{11}$;
   $Li_{10}GeP_2S_{11}$;
   $xLi_2S \cdot yP_2S_5 \cdot (100-x-y)$ LiX, where X is Cl, Br, or I, x and y are mass % of from about 30% to about 50% and where x+y is greater than about 75%;
   ground or milled combinations of $Li_2S$ with $P_2S_5$ and/or $GeS_2$;
   $Li_{1.3}Al_{0.3}Ti_{1.7}(PO_4)_3$ (LATP);
   $Li_{0.33}La_{0.55}TiO_3$ (LLTO);
   $Li_{9.54}Si_{1.74}P_{1.44}S_{11.7}Cl_{0.3}$;
   any combinations thereof; and
   any of the solid non-elastic electrolytes in a composite with $Li_6ZnNb_4O_{14}$ (LZNO).

17. The AC for storage and release of lithium according to claim 12, wherein the SEE comprises:
   at least one ammonium or phosphonium ion of the structure: $[(CR^1R^2)_n]_w Z(R^3)_{4-2w}^{+}$, where:
   n is 4 to 6;
   w is 0 to 2;
   Z is N or P;
   $R^3$ groups are independently $C_1$-$C_8$ alkyl or $C_6$-$C_{10}$ aryl and is unsubstituted or substituted one or more times with fluorine, alkyl, monofluorinated to perfluorinated alkyl, alkoxy, monofluorinated to perfluorinated alkoxy, phenyl, monofluorinated to perfluorinated phenyl, phenoxy or monofluorinated to perfluorinated phenoxy, and where any alkyl or alkoxy group is linear, branched or cyclic; and
   $R^1$ and $R^2$ groups are independently hydrogen, $C_1$-$C_8$ alkyl, $C_1$-$C_8$ alkoxy, $C_6$-$C_{10}$ aryl, or $C_6$-$C_{10}$ aryloxy and are unsubstituted or substituted one or more times with fluorine, alkyl, monofluorinated to perfluorinated alkyl, alkoxy, monofluorinated to perfluorinated alkoxy, phenyl, monofluorinated to perfluorinated phenyl, phenoxy or monofluorinated to perfluorinated phenoxy, and where any alkyl or alkoxy group is linear, branched or cyclic; and
   at least one closo-borane anion selected from the group consisting of $CB_{11}H_{12}^{-}$, $CB_9H_{10}^{-}$, $B_{12}H_{12}^{-2}$, and $C_yB_{a-y}H_{a-z}X_z^{-(2-y)}$,
where:
   y is 0 or 1;
   a is 12 when y is 0 and a is 10 or 12 when y is 1;
   z is 0 to a; and
   X is independently halogen, alkyl, alkoxy, aryl, alkylaryl, arylalkyl, and/or aryloxy substituents and wherein alkyl groups can be linear, branched, or cyclic, and wherein any substituent can be partially or fully halogenated, or any combination thereof.

18. The AC for storage and release of lithium according to claim 17, wherein the ammonium or phosphonium ion has the structure:
   $Z(R^3)_4^{+}$ and at least one $R^3$ is a different structure than other of the $R^3$, or $R^3$ contains a chiral center and a plurality of $R^3$ groups is racemic;
   $[(CR^1R^2)_n]Z(R^3)_2^{+}$ and at least one $R^3$ is a different structure than other of the $R^3$, or $R^3$ contains a chiral center and a plurality of $R^3$ groups is racemic and/or the $[(CR^1R^2)_n]Z^{+}$ cyclic has at least one of the $CR^1R^2$ having $R^1$ different from $R^2$; or
   a spiro-ammonium or phosphonium ion with the structure $[(CR^1R^2)_n]_2Z^{+}$ wherein the two of $[(CR^1R^2)_n]Z^{+}$ cyclics are different or the $[(CR^1R^2)_n]Z^{+}$ cyclics are the same with at least one of the $CR^1R^2$ has different $R^1$ and $R^2$ groups and where the $R^1$ and $R^2$ groups are randomly situated on both faces of the structure.

19. The AC for storage and release of lithium according to claim 18, wherein the SEE further comprises at least one lithium salt having a closo-borane anion selected from one or more of $CB_{11}H_{12}^{-}$, $CB_9H_{10}^{-}$, $B_{12}H_{12}^{-2}$, and $C_yB_{a-y}H_{a-z}X_z^{-(2-y)}$, where:
   y is 0 or 1;
   a is 12 when y is 0, and a is 10 or 12 when y is 1;
   z is 0 to a; and
   X is independently halogen, alkyl, alkoxy, aryl, alkylaryl, arylalkyl, and/or aryloxy substituents and wherein alkyl groups can be linear, branched, or cyclic, and wherein any substituent can be partially or fully halogenated, or any combination thereof.

* * * * *